United States Patent

Quencer

[11] Patent Number: 5,085,670
[45] Date of Patent: Feb. 4, 1992

[54] PRODUCTION OF POTASSIUM CHLORIDE CRYSTALS

[75] Inventor: Lisa B. Quencer, Shepherd, Mich.

[73] Assignee: The Dow Chemical Company, Midland, Mich.

[21] Appl. No.: 583,893

[22] Filed: Sep. 17, 1990

[51] Int. Cl.⁵ .................. C01D 3/24; C01D 3/04
[52] U.S. Cl. ................... 23/302 R; 23/300; 423/499
[58] Field of Search .............. 23/302 R, 300; 423/499

[56] References Cited

U.S. PATENT DOCUMENTS

| 3,248,182 | 4/1966 | Herink et al. | 23/300 |
| 3,271,106 | 9/1966 | Nylander | 23/302 R |
| 3,598,544 | 8/1971 | Teot | 23/302 R |
| 3,725,014 | 4/1973 | Pestonji et al. | 23/300 |
| 3,770,390 | 11/1973 | Teat | 423/499 |
| 3,853,490 | 12/1974 | Boeglin et al. | 23/300 |
| 4,562,058 | 12/1985 | Dancy et al. | 23/302 R |

FOREIGN PATENT DOCUMENTS

| 202859 | 10/1983 | German Democratic Rep. | 423/499 |
| 4011313 | 8/1970 | Japan | 23/300 |

Primary Examiner—John Niebling
Assistant Examiner—Brian M. Bolam

[57] ABSTRACT

Potassium chloride crystals of larger and/or more regular size are produced by conducting the crystallization in the presence of a small amount of a branched $C_{12}$ monoalkylated diphenyl ether sulfonate or a linear $C_6$ alkylated diphenylether sulfonate.

3 Claims, No Drawings

PRODUCTION OF POTASSIUM CHLORIDE CRYSTALS

BACKGROUND OF THE INVENTION

This invention relates to a process for crystallizing potassium chloride. In particular, this invention relates to a process for enhancing the crystal size and distribution of potassium chloride crystals.

It is known to recover potassium chloride from brines containing the potassium salt as well as other salts. It is also well recognized in the art that crystal habit modification is frequently desirable or necessary to obtain crystals having a desired size distribution and shape. Particularly, it is frequently desirable to produce crystals that are relatively large in size. Small crystals or fines often tend to cake and cause fugitive dust emissions.

Various attempts have been made to solve the problem of small crystal size. For example, Nylander in U.S. Pat. No. 3,271,106 taught that potassium sulfate and potassium chloride crystals having relatively large crystal sizes are obtained when potassium chloride is reacted with solid potassium magnesium double sulfate in an aqueous medium in the presence of specified neutralized sulfonates. Later, Dancy in U.S. Pat. No. 4,562,058 taught that this reaction could be further improved by the use of a monosulfonated or monosulfated surfactant and a neutralized disulfonated surfactant in a weight ratio of from about 0.14 to about 0.69.

Teot, in U.S. Pat. No. 3,598,544, taught that the salts of alkyl diphenyl ether mono- or disulfonates improve the crystallization of ammonium sulfate, potassium nitrate and potassium chromate. One of the problems in the area of crystal habit modification is inability to transfer information learned from one crystal system to another. Crystallization parameters vary significantly from one crystal system to another and therefore additives that improve the crystallization of one system frequently have no impact on a different system.

Thus, there remains a need for improved methods of crystal modification in different crystal systems. This invention relates to the production of potassium chloride, more particularly to a process for enhancing the size of potassium chloride crystals.

SUMMARY OF THE INVENTION

The present invention is directed to a process for producing potassium chloride crystals from a synthetic or naturally occurring brine comprising carrying out the crystallization in the presence of an effective amount of an alkylated diphenyl ether disulfonate surfactant wherein the alkyl group is (1) a branched $C_{12}$ moiety with a degree of monoalkylation greater than about 85 percent or (2) a linear $C_6$ moiety.

It is surprising that the specific disulfonates of this invention result in marked improvement in particle size and particle size distribution when used in potassium chloride crystallization.

DETAILED DESCRIPTION OF THE ILLUSTRATIVE EMBODIMENTS

In the process of the present invention, a small amount of the surfactant is added to a saturated aqueous solution containing potassium chloride. Crystallization is brought about by conventional means such as evaporation of the solvent, cooling or a combination of both methods.

The alkylated diphenyloxide disulfonate surfactant useful in this invention is selected from surfactants wherein the alkyl group is a branched $C_{12}$ alkyl or a linear $C_6$ alkyl. When the branched $C_{12}$ alkylated diphenyl ether sulfonate is used, it is at least about 85 percent monoalkylated. It is preferred that the degree of monoalkylation approach 100 percent. In the case of the linear $C_6$ disulfonate, the degree of monoalkylation is greater than about 50 percent and preferably is about 80 percent.

Alkylated diphenyloxide disulfonates and their methods of preparation are well-known and reference is made thereto for the purposes of this invention. The disulfonates of the present invention may be prepared by modifications to known methods of preparation of sulfonates. Representative methods of preparation of sulfonates are disclosed in U.S. Pat. Nos. 3,264,242; 3,634,272; and 3,945,437 (all of which are hereby incorporated by reference). Commercial methods of preparation of the alkylated diphenyl oxide sulfonates generally do not produce species which are exclusively monoalkylated, monosulfonated, dialkylated or disulfonated. The commercially available species are predominantly (greater than 90 percent) disulfonated and are a mixture of mono- and dialkylated with the percentage of dialkylation being about 15 to about 25 and the percentage of monoalkylation being about 75 to 85 percent. Most typically, the commercially available species are about 80 percent monoalkylated and 20 percent dialkylated.

The monoalkylated disulfonates useful in the practice of the present invention may be obtained by a modification of known processes wherein the alkylated diphenyl oxides are separated by distillation to obtain a fraction enriched in monoalkylated species. This monalkylated enriched fraction is then subjected to a sulfonation step to obtain the desired monoalkylated disulfonates.

The disulfonates are typically used in the salt form, although the acid form might be used if desired. The disulfonate may be a salt of an alkali metal, an alkaline earth metal, ammonium or substituted ammonium. It is preferred to use the sodium salt of the disulfonic acid.

The amount of disulfonate surfactant useful as a crystal growth modifier is any which will result in the growth of larger crystals. Preferably this amount is at least about 25 parts per million based on the active weight per total volume and more preferably it is at least about 50 ppm. The upper limit on the amount of disulfonate surfactant useful in this invention may be economic or functional. The functional upper limit is that amount at which solubility becomes a problem. Preferably the upper limit is no greater than about 4000 ppm, more preferably no greater than about 1000 ppm and most preferably no greater than about 500 ppm.

The following examples are provided to illustrate the invention and should not be interpreted as limiting it in any way. Unless stated otherwise, all parts and percentages are by weight.

EXAMPLES 1-4

A brine is prepared consisting of 39.47 g of a mixture of salts consisting predominantly of KCl with minor amounts of NaCl, $MgCl_2$ and $CaCl_2$ per 100 g of distilled water. The crystallization is conducted by pipetting 100 ml portions of the brine at 90° C. into wide mouth Erlenmeyer flasks which have been secured in a water bath shaker and equilibrated at 60° C. The water bath shaker is used to control the temperature and agitate the crystallizing solutions. The portions tested contain the concentration of the alkylated diphenyloxide disulfonates indicated in Table I below. The type of alkyl group and the approximate degree of monosulfonation is also shown in Table I below.

The flasks are allowed to cool to room temperature with continuous agitation over a period of approximately four hours. Crystallization occurs without the need for crystal seeding. The resulting crystals are filtered, dried and stored at room temperature. Particle size distributions are obtained by sieve analysis using the following sizing:

25 mesh: 710 microns
35 mesh: 500 microns
45 mesh: 355 microns
60 mesh: 250 microns
pan: less than 250 microns The sieves are stacked, tapped six times and shook fifteen minutes in an Eberbach shaker on high speed. The percentage of crystals retained on 25 mesh when the surfactant is used is measured and compared to that obtained in the absence of any modifier. The percentage increase in crystals retained which is obtained using specified surfactants as compared to that obtained in the absence of surfactants is given in Table I below.

The data above shows that the alkylated diphenyloxide disulfonates of the present invention result in increased percentages of crystals of larger size. Examples 1 and C-1, C-2, and C-3 show that branched dodecylated sulfonates having a degree of monoalkylation inside the scope of the present invention obtain a higher increase in the percentage of potassium chloride crystals retained on 25 mesh at a lower dosage than is obtained using compounds outside the scope of the invention. Example 2 and C-4 show that while the hexylated sulfonates were used at approximately the same dosage, the surfactant within the scope of the invention results in more than a 300 percent increase in the percentage of crystals retained on 25 mesh.

TABLE I

| Example | Alkyl Group | % Mono alkylated | Dosage (ppm) | % Increase Over Control |
|---|---|---|---|---|
| 1 | Dodecyl (branched) | 100 | 24 | 73.1 |
| C-1[1] | Dodecyl (branched) | 80 | 70 | 58.9 |
| C-2[1] | Dodecyl (branched) | 60 | 90 | 49.56 |
| C-3[1] | Dodecyl (branched) | 0 | 112 | 9.05 |

TABLE I-continued

| Example | Alkyl Group | % Mono alkylated | Dosage (ppm) | % Increase Over Control |
|---|---|---|---|---|
| 2 | Hexyl (Linear) | 80 | 106 | 78.6 |
| C-4 | Hexyl | 0 | 103 | 22.3 |

[1]Not an embodiment of the invention

EXAMPLES 3, C-3 AND 4

The procedure outlined for Examples 1 and 2 and C-1 through C-4 is followed with the exception that the Brine is a synthetic brine prepared using 28.04 g NaCl, and 27.33 g KCl per 100 g of distilled water. The sieves containing the crystals are subjected to three cycles of tapping six times and shaking for 30 minutes. The data obtained is given in Table II below.

TABLE II

| Example | Alkyl Group | % Mono-alkylated | Dosage (ppm) | % Increase Over Control |
|---|---|---|---|---|
| 3 | Branched Dodecyl | 100 | 18 | 25.2 |
| C-5[1] | Branched Dodecyl | 80 | 43 | 23 |
| 4 | Linear Hexyl | 80 | 55 | 30.3 |

[1]Not an embodiment of the invention.

The data in Table II above show that the alkylated disulfonates of the present invention are also effective with a synthetic brine. A comparison of Examples 3 and C-5 show that the disulfonate within the scope of the invention obtains comparable improvements at less than half the dosage.

What is claimed is:

1. A process for producing potassium chloride crystals from a synthetic or naturally occurring brine comprising carrying out the crystallization in the presence of an amount of an alkylated diphenyl ether disulfonic acid or salt thereof effective to result in the production of crystals larger than those produced in the absence of said acid or salt, wherein the alkyl group is a branched $C_{12}$ moiety with a degree of monoalkylation greater than about 95 percent.

2. A process for producing potassium chloride crystals from a synthetic or naturally occurring brine comprising carrying out the crystallization in the presence of an amount of a linear hexyl diphenyl ether disulfonic acid or salt thereof effective to result in the production of crystals larger than those produced in the absence of said acid or salt, wherein the degree of monoalkylation is greater than about 50 percent.

3. The process of claim 2 wherein the degree of monoalkylation is about 80 percent.

* * * * *